United States Patent
Wrobel et al.

(10) Patent No.: US 10,482,787 B2
(45) Date of Patent: Nov. 19, 2019

(54) SELECTIVE PRESENTATION OF COASTING COACH INDICATOR FOR CONSECUTIVE LEARNED DECELERATION AREAS IN CLOSE PROXIMITY

(71) Applicant: Toyota Motor Engineering & Manufacturing North America, Inc., Erlanger, KY (US)

(72) Inventors: Shannon Alicia Wrobel, Ann Arbor, MI (US); Joshua D. Payne, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 114 days.

(21) Appl. No.: 15/464,509

(22) Filed: Mar. 21, 2017

(65) Prior Publication Data
US 2018/0277019 A1    Sep. 27, 2018

(51) Int. Cl.
| G09B 19/14 | (2006.01) |
| G09B 19/16 | (2006.01) |
| G08G 1/0962 | (2006.01) |
| G01C 21/34 | (2006.01) |
| G09B 5/02 | (2006.01) |

(52) U.S. Cl.
CPC ............ *G09B 19/167* (2013.01); *G01C 21/34* (2013.01); *G08G 1/09626* (2013.01); *G09B 19/14* (2013.01); *G09B 5/02* (2013.01)

(58) Field of Classification Search
CPC ......... G08G 1/096888; G08G 1/09626; G08G 1/096716; G08G 1/0962; G08G 1/133; G09B 19/167; G09B 5/02; G09B 19/14
See application file for complete search history.

(56) References Cited

U.S. PATENT DOCUMENTS

| 8,862,342 | B2 | 10/2014 | Oguri et al. | |
| 9,202,378 | B2 | 12/2015 | Otake | |
| 9,262,918 | B2 | 2/2016 | Otake | |
| 9,495,874 | B1 * | 11/2016 | Zhu | G06N 99/005 |
| 9,618,357 | B2 * | 4/2017 | Roelle | G01C 21/3682 |
| 2005/0040702 | A1 * | 2/2005 | Yen | B60Q 1/302 303/138 |

(Continued)

*Primary Examiner* — Samchuan C Yao
*Assistant Examiner* — Michael C Humphrey
(74) *Attorney, Agent, or Firm* — Christopher G. Darrow; Darrow Mustafa PC

(57) ABSTRACT

A vehicle can be configured to provide coasting coach support when approaching a learned deceleration area, advising on how to more efficiently operate the vehicle as it approaches the learned deceleration area. An indicator can be presented within the vehicle to inform the driver that coasting coach support is provided for the learned deceleration area. However, in certain situations, it may not be possible for a vehicle to provide coasting coach support for a learned deceleration area, such as may occur when the vehicle encounters two consecutive learned deceleration areas located in close proximity to each other. There may not be sufficient time to provide coasting coach support for the second of the two consecutive learned deceleration areas. In such instances, the vehicle can be configured to present the coasting coach indicator for the first deceleration area and to disable the coasting coach indicator for the second deceleration area.

20 Claims, 4 Drawing Sheets

(56) References Cited

U.S. PATENT DOCUMENTS

| | | | |
|---|---|---|---|
| 2010/0145600 A1* | 6/2010 | Son | B60W 50/14 701/123 |
| 2011/0190972 A1* | 8/2011 | Timmons | G01C 21/34 701/31.4 |
| 2011/0260886 A1* | 10/2011 | Nagura | G08G 1/081 340/905 |
| 2012/0078467 A1* | 3/2012 | Schweikl | B60K 26/021 701/36 |
| 2012/0078468 A1* | 3/2012 | Popp | B60K 26/021 701/36 |
| 2012/0078496 A1* | 3/2012 | Lindhuber | B60K 35/00 701/123 |
| 2013/0171590 A1* | 7/2013 | Kumar | B61L 3/006 434/62 |
| 2013/0204460 A1* | 8/2013 | Uno | B60W 30/18154 701/1 |
| 2013/0246421 A1* | 9/2013 | Yamada | B60W 30/143 707/736 |
| 2014/0046581 A1* | 2/2014 | Ota | G08G 1/096716 701/408 |
| 2014/0046595 A1* | 2/2014 | Segawa | G01C 21/34 701/541 |
| 2014/0058579 A1* | 2/2014 | Ono | G06F 17/00 701/1 |
| 2014/0379213 A1* | 12/2014 | Otake | G08G 1/09626 701/36 |
| 2015/0149071 A1* | 5/2015 | Uno | G08G 1/09626 701/408 |
| 2016/0328968 A1* | 11/2016 | Elsheemy | G01S 19/13 |
| 2016/0334229 A1* | 11/2016 | Ross | B60W 50/029 |
| 2017/0241786 A1* | 8/2017 | Ohira | G01C 21/16 |

* cited by examiner

US 10,482,787 B2

SELECTIVE PRESENTATION OF COASTING COACH INDICATOR FOR CONSECUTIVE LEARNED DECELERATION AREAS IN CLOSE PROXIMITY

FIELD

The subject matter described herein relates in general to vehicles and, more particularly, to educating vehicle drivers on braking behavior when approaching a deceleration area.

BACKGROUND

Some vehicles are configured to educate drivers on how to more efficiently operate the vehicle. For example, some vehicles coach a driver when approaching a repeatedly-occurring deceleration area. In such case, the vehicle advises the driver when to remove his or her foot from the accelerator pedal to allow the vehicle to coast and when to brake. Following such advice can result in improved fuel economy.

SUMMARY

In one respect, the subject matter presented herein is directed to a method for a vehicle. The vehicle can be configured to provide coasting coach support when approaching a learned deceleration area. The vehicle can be configured to present a coasting coach indicator within the vehicle for the learned deceleration area. The method can include identifying consecutive learned deceleration areas including a first learned deceleration area and a second learned deceleration area. The second learned deceleration area can be subsequent to the first learned deceleration area along a travel path of the vehicle. The method can include determining whether the first learned deceleration area and the second learned deceleration area are located in close proximity to each other. Responsive to determining that the first learned deceleration area and the second learned deceleration area are located in close proximity to each other, the method can include presenting the coasting coach indicator within the vehicle for the first learned deceleration area. Thus, the driver is informed that coasting coach support is provided for the first learned deceleration area. Further responsive to determining that the first learned deceleration area and the second learned deceleration area are located in close proximity to each other, the method can include disabling the coasting coach indicator for the second learned deceleration area. As a result, the coasting coach indicator is not presented within the vehicle for the second learned deceleration area. Thus, the driver is informed that coasting coach support is not provided for the second learned deceleration area.

In another respect, the subject matter presented herein is directed to a system for a vehicle. The vehicle can be configured to provide coasting coach support when approaching a learned deceleration area. The vehicle can be configured to present a coasting coach indicator within the vehicle for the learned deceleration area. The system can include one or more processors. The one or more processors can be programmed to initiate executable operations. The executable operations can include identifying consecutive learned deceleration areas including a first learned deceleration area and a second learned deceleration area. The second learned deceleration area can be subsequent to the first learned deceleration area along a travel path of the vehicle. The executable operations can include determining whether the first learned deceleration area and the second learned deceleration area are located in close proximity to each other. Responsive to determining that the first learned deceleration area and the second learned deceleration area are located in close proximity to each other, the executable operations can include presenting the coasting coach indicator within the vehicle for the first learned deceleration area. Thus, the driver is informed that coasting coach support is provided for the first learned deceleration area. Further responsive to determining that the first learned deceleration area and the second learned deceleration area are located in close proximity to each other, the executable operations can include disabling the coasting coach indicator for the second learned deceleration area. As a result, the coasting coach indicator is not presented within the vehicle for the second learned deceleration area. Thus, the driver is informed that coasting coach support is not provided for the second learned deceleration area.

In still another respect, the subject matter presented herein is directed to a computer program product for a vehicle. The vehicle can be configured to provide coasting coach support when approaching a learned deceleration area. The vehicle can be configured to present a coasting coach indicator within the vehicle for the learned deceleration area. The computer program product can include a computer readable storage medium having program code embodied therein. The program code is executable by a processor to perform a method. The method can include identifying consecutive learned deceleration areas including a first learned deceleration area and a second learned deceleration area. The second learned deceleration area can be subsequent to the first learned deceleration area along a travel path of the vehicle. The method can include determining whether the first learned deceleration area and the second learned deceleration area are located in close proximity to each other. Responsive to determining that the first learned deceleration area and the second learned deceleration area are located in close proximity to each other, the method can include presenting the coasting coach indicator within the vehicle for the first learned deceleration area. Thus, the driver is informed that coasting coach support is provided for the first learned deceleration area. Further responsive to determining that the first learned deceleration area and the second learned deceleration area are located in close proximity to each other, the method can include disabling the coasting coach indicator for the second learned deceleration area. As a result, the coasting coach indicator is not presented within the vehicle for the second learned deceleration area. Thus, the driver is informed that coasting coach support is not provided for the second learned deceleration area.

DETAILED DESCRIPTION

Figure 1:
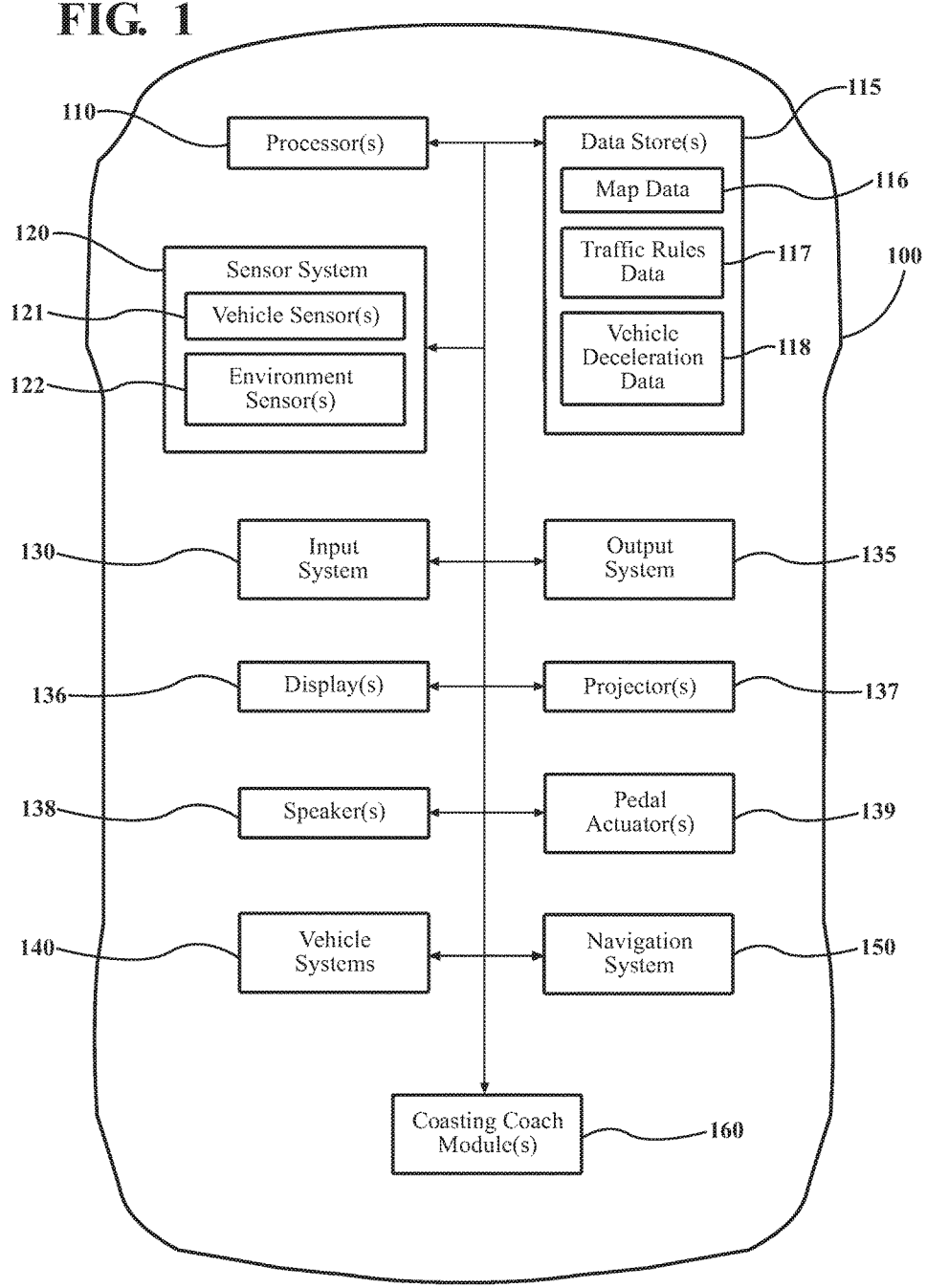
FIG. 1 is an example of a vehicle.

A vehicle can be configured to provide coasting coach support to a driver at a learned deceleration area and/or a learned stop. The coasting coach support can advise the driver on how to more efficiently operate the vehicle (e.g., decelerate) as it approaches the learned deceleration area/learned stop. Prior to and/or while the coasting coach support is being provided, an indicator can be presented within the vehicle to inform the driver that coasting coach support is provided for the learned deceleration area/learned stop. However, in certain situations, it may not be possible for a vehicle to provide coasting coach support for some learned deceleration areas/learned stops. For instance, when the vehicle encounters two consecutive learned deceleration areas/learned stops located in close proximity to each other, the vehicle may not be able to provide coasting coach support for the second learned deceleration area/learned stop. Thus, coasting coach support for the first learned deceleration area/learned stop will still be provided at a point in which coasting coach support for the first learned deceleration area/learned stop should begin. As a result, the coasting coach indicator may be presented within the vehicle for both the first learned deceleration area/learned stop and the second learned deceleration area/learned stop, though coasting coach support is actually only being provided for the first learned deceleration area/learned stop. Consequently, a driver may be potentially given a false impression that coasting coach support is available for the second learned deceleration area/learned stop when in fact it is not.

As used herein, "deceleration area" means any area in which a vehicle decelerates or comes to a stop. A deceleration area can occur based on traffic regulating devices (e.g., stop lights, stop signs, yield signs, road markings signs, traffic lights, traffic signs, school zones, etc.), laws, rules, regulations, ordinances, etc. Alternatively or in addition, a deceleration area can be based on prevailing conditions (e.g., traffic congestion, construction, etc.). Thus, a deceleration area can be known in advance, or it can occur in real-time. A "learned deceleration area" is an area in which a vehicle has exhibited a similar deceleration pattern in substantially the same area. More particularly, a "learned deceleration area" can be an area in which a vehicle has exhibited a similar deceleration pattern in substantially the same area for at least a threshold number of times, a minimum number of times, and/or a statistically significant number of times. The term "consecutive deceleration areas" means two deceleration areas with no other deceleration area between them. The term "consecutive learned deceleration areas" means two learned deceleration areas with no other deceleration area between them.

One example of a deceleration area is a stop. As used herein, the term "stop" is an area in which a moving vehicle comes to a stop. The stop may occur based on traffic regulating devices, laws, rules, regulations, ordinances, and/or prevailing conditions. Thus, a stop can be known in advance, or it can occur in real-time. A "learned stop" is an area in which a vehicle has exhibited a similar deceleration pattern to come to a stop in substantially the same area. More particularly, a "learned stop" can be an area in which a vehicle has exhibited a similar deceleration pattern to come to a stop in substantially the same area for at least a threshold number of times, a minimum number of times, and/or a statistically significant number of times. The term "consecutive stops" means two stops with no other stops between them. The term "consecutive learned stops" means two learned stops with no other stops between them. The terms "learned stop" and "learned deceleration area" can be used interchangeably for purposes of this description. Thus, if a portion of this description is directed to a learned deceleration area, then it will be understood that the description can apply equally to learned stops, and vice versa.

The term "coasting coach support" means any guidance, assistance, advice, suggestions, and/or recommendations, in any form, relating to decelerating a vehicle, now known or later developed. More particularly, "coasting coach support" can include any guidance, assistance, advice, suggestions, and/or recommendations relating to decelerating a vehicle at least from a fuel economy standpoint. For example, the "coasting coach support" can include advice on when the driver should remove his or her foot from the accelerator pedal to allow the vehicle to coast and/or when to engage the brake pedal and an appropriate level, amount, or degree of braking. The term "coasting coach indicator" means anything that is perceptible to one or more human senses that indicates, alerts, notifies, signals, and/or provides information to a vehicle occupant that coating coach support is activated, available, and/or provided. The term "in close proximity", as used herein relative to two consecutive learned deceleration areas/learned stops, means that the distance between the two learned deceleration areas/learned stops is such that coasting coach support cannot be fully provided for the second learned deceleration area/learned stop.

Methods, systems, apparatus, and/or computer program products described herein can be directed to such scenarios. Consecutive learned deceleration areas can be identified. The consecutive learned deceleration areas can include a first learned deceleration area and a second learned deceleration area. The second learned deceleration area can be subsequent to the first learned deceleration area relative to a travel direction of the vehicle. It can be determined whether the first learned deceleration area and the second learned deceleration area are located in close proximity to each other. Responsive to determining that the first learned deceleration area and the second learned deceleration area are located in close proximity to each other, the coasting coach indicator can be presented within the vehicle for the first learned deceleration area, and the coasting coach indicator can be disabled for the second learned deceleration area. Thus, the driver is informed that coasting coach support is provided for the first learned deceleration area but that coasting coach support is not provided for the second learned deceleration area.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some instances, the vehicle 100 can be a conventional vehicle. In other instances, the vehicle 100 can be a hybrid vehicle, such as a plug-in hybrid vehicle.

The vehicle 100 can include various elements. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The various elements can be communicatively linked through one or more communication networks. As used herein, the term "communicatively linked" can include direct or indirect connections through a communication channel or pathway or another component or system. A "communication network" means one or more components designed to transmit and/or receive information from one source to another. One or more of the elements of the vehicle 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and or satellite-based wireless network, GSM, TDMA, CDMA, WCDMA networks or the like). The communication network can include wired communication links and/or wireless communication links. The communication network can include any combination of the above networks and/or other types of networks.

The vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the vehicle 100.

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360 degree ground views. The map data 116 can include measurements, dimensions, distances, and/or information for one or more items included in the map data 116 and/or relative to other items included in the map data 116. The map data 116 can include a digital map with information about road geometry. In one or more arrangement, the map data 116 can information about the ground, terrain, roads, surfaces, and/or other features of one or more geographic areas. The map data can include elevation data in the one or more geographic areas. The map data can define one or more ground surfaces, which can include paved roads, unpaved roads, land, and other things that define a ground surface. The map data 116 can be high quality and/or highly detailed.

In one or more arrangements, the one or more data stores 115 can include traffic rules data 117. The traffic rules data 117 can include one or more traffic rules. As used herein, "traffic rule" is any law, rule, ordinance or authority that governs the operation of a motor vehicle, including instances, situations, and/or scenarios in which a motor vehicle is required to stop or reduce speed. The traffic rules data 117 can include speed limit data. The traffic rules data 117 can be international, federal, national, state, city, township and/or local laws, rules, ordinances and/or authorities.

In one or more arrangements, the one or more data stores 115 can include vehicle deceleration data 118. The vehicle deceleration data 118 can include data acquired by the sensor system 120 of the vehicle 100. The vehicle deceleration data 118 can include learned deceleration areas, learned stops, deceleration profiles, brake pedal data, location data, distance data, temporal data, and any data associated with the deceleration or stopping of the vehicle 100. The vehicle deceleration data 118 can include information associated with learned stops or learned deceleration areas, including a reset distance and/or a start point for providing coasting coach support.

As noted above, the vehicle 100 can include the sensor system 120. The sensor system 120 can include one or more sensors. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the vehicle 100 (including any of the elements shown in FIG. 1).

The sensor system 120 can include any suitable type of sensor. For instance, the sensor system 120 can include one or more vehicle sensors 121, which can be configured to acquire, detect, determine, assess, monitor, measure, quantify and/or sense information about the vehicle 100 itself (e.g., position, location, orientation, speed, acceleration, deceleration, accelerator pedal position, brake pedal position, etc.). Alternatively or in addition, the sensor system 120 can include one or more environment sensors 122, which can be configured to acquire, detect, determine, assess, monitor, measure, quantify and/or sense data or information about the external environment in which a vehicle is located or one or more portions thereof. For example, such data or information can be related to obstacles in at least a portion of the external environment of the vehicle 100 and/or other things in the external environment of the vehicle 100, such as, for example, lane markers, signs, traffic lights, traffic signs, lane lines, crosswalks, curbs proximate the vehicle 100, off-road objects, etc. In one or more arrangements, the sensor system 120 can include one or more radar sensors, one or more LIDAR sensors, one or more sonar sensors, one or more cameras, and/or one or more ranging sensors The vehicle 100 can include an input system 130. An "input system" includes any device, component, system, element or arrangement or groups thereof that enable information/data to be entered into a machine. The input system 130 can be configured to receive an input from a vehicle occupant (e.g. a driver or a passenger). The vehicle 100 can include an output system 135. An "output system" includes any device, component, system, element or arrangement or groups thereof that enable information/data to be presented to a vehicle occupant (e.g. a person, a vehicle occupant, etc.). The output system 135 can be configured to present information/data to a vehicle occupant. Some components of the vehicle 100 may serve as both a component of the input system 130 and a component of the output system 135.

In one or more arrangements, the output system 135 can include one or more displays 136. "Display" is defined as a component or a group of components that present information/data in a form that is perceptible to the human sense of sight. For instance, the display 136 can present video, images, graphics, etc. The display 136 can be any suitable type of display. For instance, the display 136 can be a touch screen display. In one or more arrangements, the display 136 can be a heads-up display, a display for a navigation system, and/or a display included in an instrument cluster. The display(s) 136 can be provided in any suitable location within the vehicle 100. In one or more arrangements, the display(s) 136 can be located in a front interior portion of the vehicle 100. As an example, the display(s) 136 can be included in a dashboard or instrument panel of the vehicle 100.

Alternatively or in addition to any of the above examples, the output system 135 can include one or more projectors 137. The projector(s) 137 can be configured to present visual data on one or more projection surfaces. Examples of projection surfaces can be a window (e.g., the front windshield, a side window, etc.), a wall, a panel, or a screen, just to name a few possibilities. The projector(s) 137 and/or the projection surface(s) may be part of a heads-up display.

Alternatively or in addition to any of the above examples, the output system 135 can include one or more speakers 138. "Speaker" means one or more elements, one or more devices, one or more components, one or more systems, and/or any combination thereof that produce sound in response to an audio signal input. Examples of speakers include, for example, electroacoustic transducers, sound chips, and sound cards. Each speaker 138 can have one or more audio output channels operatively connected thereto.

Alternatively or in addition to any of the above examples, the output system 135 can include one or more pedal actuators 139. The one or more pedal actuators 139 can be associated with a brake pedal of the vehicle 100 and/or an accelerator pedal of the vehicle 100. The one or more pedal actuators 139 can be operatively connector to adjust the resistance level of the brake pedal and/or the accelerator pedal.

The vehicle 100 can include one or more vehicle systems 140. Examples of the one or more vehicle systems 140 include a propulsion system, a braking system, a steering system, throttle system, a transmission system, a signaling system, and/or a navigation system. Each of these systems can include one or more mechanisms, devices, elements, components, systems, and/or combination thereof, now known or later developed. However, the vehicle 100 can include more, fewer, and/or different vehicle systems. It should be appreciated that although particular vehicle systems are separately defined, each or any of the systems or portions thereof may be otherwise combined or segregated via hardware and/or software within the vehicle 100.

The vehicle 100 can include a navigation system 150. The navigation system 150 can include one or more mechanisms, devices, elements, components, systems, applications and/or combinations thereof, now known or later developed, configured to determine the geographic location of the vehicle 100 and/or to determine a travel route for the vehicle 100.

The navigation system 150 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 150 can be configured to update the travel route dynamically while the vehicle 100 is in operation.

The navigation system 150 can include a global positioning system, a local positioning system or a geolocation system. The navigation system 150 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 150 can use Transmission Control Protocol (TCP) and/or a Geographic information system (GIS) and location services.

The navigation system 150 may include a transceiver configured to estimate a position of the vehicle 100 with respect to the Earth. For example, navigation system 150 can include a GPS transceiver to determine the vehicle's latitude, longitude and/or altitude. The navigation system 150 can use other systems (e.g. laser-based localization systems, inertial-aided GPS, and/or camera-based localization) to determine the location of the vehicle 100.

Alternatively or in addition, the navigation system 150 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The vehicle 100 can include one or more actuators to modify, adjust and/or alter one or more of the vehicle systems 140 or components thereof to responsive to receiving signals or other inputs from the processor(s) 110 and/or other element of the vehicle 100. The one or more actuators can include motors, pneumatic actuators, hydraulic pistons, relays, solenoids, and/or piezoelectric actuators, just to name a few possibilities.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more coasting coach modules 160. The coasting coach module(s) 160 can be configured to perform various functions, particularly functions relating to the deceleration of a vehicle. Examples of such functions are described in U.S. Pat. Nos. 8,862,342 and 9,202,378, both of which are incorporated herein by reference. Some functions of the coasting coach module(s) 160 will be described herein.

The coasting coach module(s) 160 can be configured to receive and/or acquire data relating to decelerations of the vehicle 100, such data can include speed, acceleration/deceleration, pedal position, location, etc. The coasting coach module(s) 160 can receive and/or acquire data from the navigation system 150, the sensor system 120, the data store(s) 115, and/or any other source of information relating to the vehicle 100 and/or the external environment of the vehicle 100.

The coasting coach module(s) 160 can be configured to learn deceleration areas encountered by the vehicle 100. For instance, after the vehicle 100 decelerates in the same or substantially the same area for a predetermined minimum number of times, a threshold number of times, and/or a statistically significant number of times, the coasting coach module(s) 160 can be configured to learn that the area is a deceleration area. The predetermined minimum number of times, a threshold number of times, and/or a statistically significant number of times can be established by a vehicle manufacturer or some other entity. The coasting coach module(s) 160 can be configured to learn the vehicle's deceleration profiles in such areas. The coasting coach module(s) 160 can be configured to generate a deceleration pattern from a current vehicle location to a target stop position. The coasting coach module(s) 160 can assist vehicle deceleration driving on the basis of the deceleration pattern, thereby reducing fuel consumption.

The coasting coach module(s) 160 can be configured to provide coasting coach support when approaching a learned deceleration area, including learned stops. Coasting coach support can be provided in one or more forms. In one or more arrangements, the coasting coach support can be provided in a visual manner. For instance, the coasting coach support can be provided on one or more of the displays 136 located within the vehicle 100. As another example, the coasting coach support can be provided on a display surface within the vehicle 100 using the projector(s) 137. In one or more arrangements, the coasting coach support can be provided in an audial manner. For instance, the coasting coach support can be provided on one or more of the speakers 138 of the vehicle. The coasting coach module(s) 160 can be configured to instruct a driver of the optimal time to release the accelerator pedal, engage the brake pedal, and/or the amount of braking. If a deceleration area or stop is not a learned deceleration area or a learned stop, the coasting coach module(s) 160 can be configured so that coasting coach support is not provided.

The coasting coach module(s) 160 can be configured to present a coasting coach indicator within the vehicle for the learned deceleration area and/or to cause the coasting coach indicator to be presented. The coasting coach indicator can make a vehicle driver aware that coasting coach support is activated, available and/or being provided for an upcoming deceleration area/stop.

Figure 2:
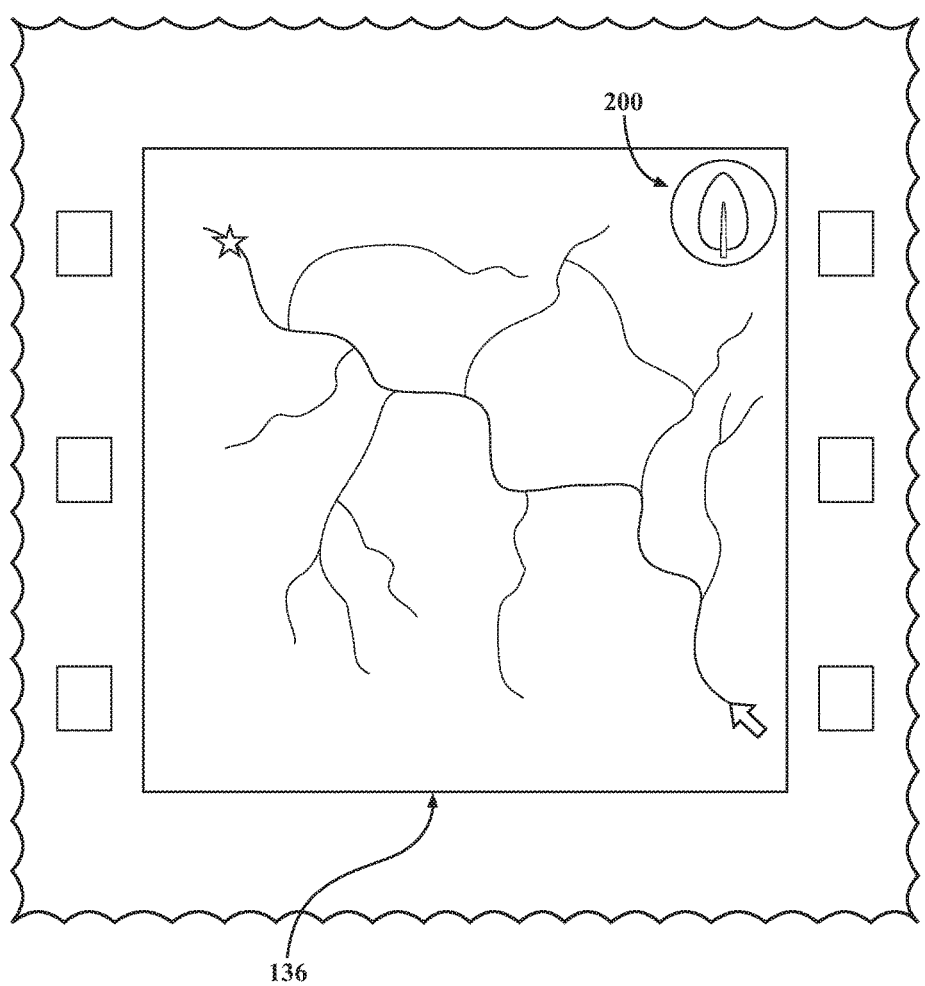
FIG. 2 is an example of a coasting coach indicator presented within the vehicle.

The coaching support indicator n be provided in any suitable form, now known or later developed. In one or more arrangements, the coasting coach indicator can be provided in a visual manner. For example, the coasting coach indicator can be an icon presented on a display (e.g., the display of the navigation system 150, an instrument panel display, and/or other display). An example of a visual coasting coach indicator is shown in FIG. 2. Referring to FIG. 2, an example of a vehicle display 136 is shown. In this example, the coasting coach indicator can be a graphical icon 200 presented on the display 136, which can be a part of the navigation system 150 of the vehicle 100. In some instances, the coasting coach indicator can be displayed on a map of the navigation system 150, as is shown in FIG. 2. In this example, the graphical icon 200 is shown as being a leaf, but arrangements are not limited to any particular icon. As another example, the visual coasting coach indicator can be one or more lights provided within the vehicle. The one or more lights can be activated to indicate that coasting coach support is available and/or being provided.

In one or more arrangements, the coasting coach indicator can be presented in an audial manner. For instance, the coasting coach indicator can be a sound, letter, word, phrase, expression, or sentence emitted by one or more speakers 138 of the vehicle 100. As an example, a message, such as "coasting coach support active", can be presented by one or more speakers 138 of the vehicle 100. In one or more arrangements, the coasting coach indicator can be presented in a haptic manner. For instance, the coasting coach indicator can be a vibration and/or other movement of a vehicle component, such as a pedal (e.g., accelerator pedal and/or brake pedal), a vehicle seat, and/or a steering wheel). Of course, it will be understood that the coasting coach indicator can be a combination of any of the above and/or other types of coasting coach indicators.

The coasting coach indicator can be presented at any suitable time. For instance, the coasting coach indicator can be presented at the same time or substantially the same time the vehicle 100 reaches the start point for coasting coach support. As another example, the coasting coach indicator can be presented slightly before the vehicle reaches the start point for coasting coach support. In some instance, the coasting coach indicator can be presented at a fixed distance relative to an approaching learned deceleration area or learned stop and/or relative to the start point for coasting coach support.

Figure 3:
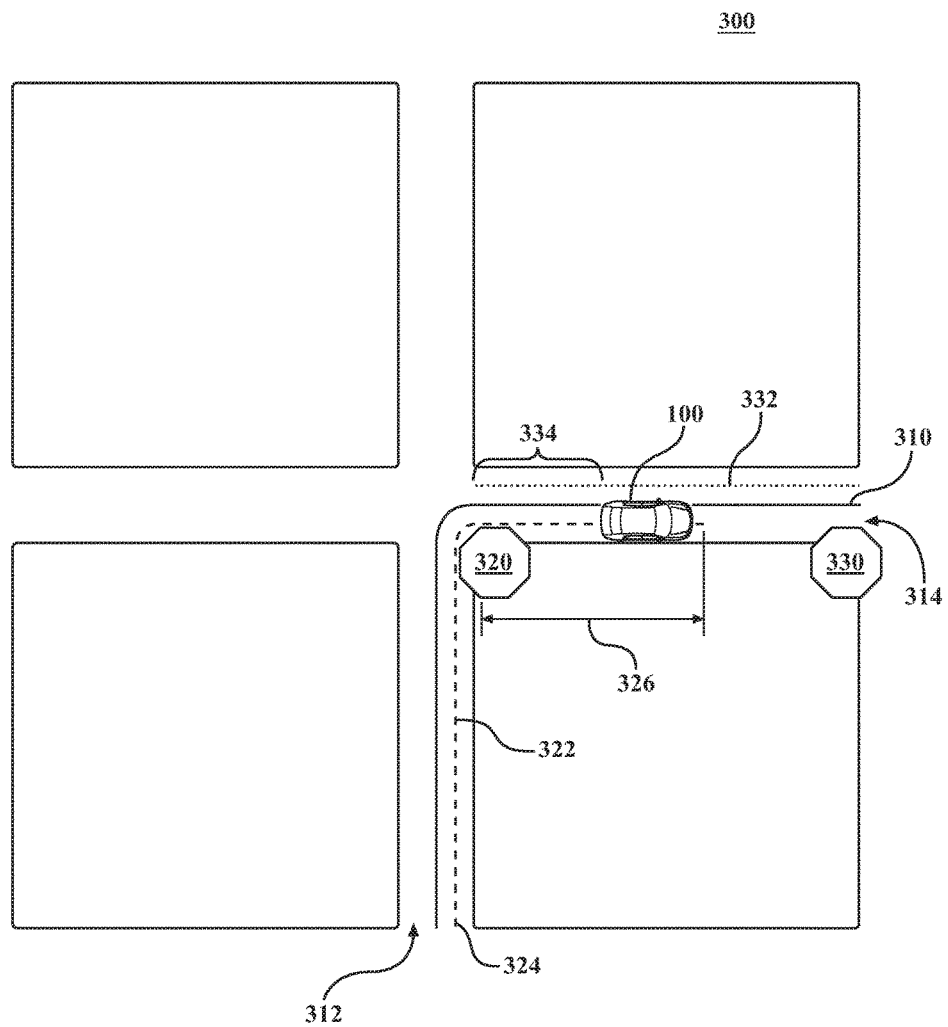
FIG. 3 is a view of an example of a driving scenario in which the vehicle encounters two consecutive deceleration areas located in close proximity.

However, in certain situations, it may not be possible for a vehicle to provide coasting coach support for some learned stops. For instance, when the vehicle encounters a driving environment in where there are two consecutive learned stops located in close proximity to each other, the vehicle may not be able to provide coasting coach support for the second learned stop. An example of such a driving environment 300 is shown in FIG. 3. The vehicle 100 has a travel path 310 that includes driving on a first road 312 and coming to a first learned stop 320. The travel path further includes a right turn onto a second road 314 and coming to a second learned stop 330.

The first learned stop 320 can have a coasting coach support area 322. The coasting coach support area 322 can have a start point 324 for coasting coach support. The term "start point" or "start point for coasting coach support" means a point, a distance, or an area located before a learned deceleration area at which coasting coach support is activated and/or begins to be provided.

The coasting coach support area 322 for the first learned stop 320 can include a reset distance 326. The term "reset distance" means a distance after a learned deceleration area or learned stop in which coaching support continues to be provided for the learned deceleration area or learned stop. In one or more arrangements, the reset distance can be defined by a predetermined distance. In one or more arrangements, the reset distance can be defined by a distance associated with a predetermined period of time. Learned deceleration areas or learned stops can have an associated reset distance for various reasons. For instance, the coasting coach module(s) 160 may need time to clear the coasting coach support for the first learned deceleration area or learned stop and initiate the coasting coach support for the second learned deceleration area or learned stop. Alternatively or in addition, there may be variations as to where the vehicle 100 actually stops with respect to a learned stop. The reset distance can provide a margin for such possibilities.

The second learned stop 330 can have a coasting coach support area 332 (only a portion of which is shown). The coasting coach support area 332 can have a start point 334 for coasting coach support. In this example, the start point 334 can be an area defined by a distance along the coasting coach support area 332. The coasting coach support area 332 can include a reset distance (not shown) following the second learned stop 330.

The coasting coach module(s) 160 can be configured to present a coasting coach indicator and to provide coasting coach support for the first learned stop 320 as well as for the second learned stop 330. However, if the first learned stop 320 and the second learned stop 330 are located in close proximity to each other, there may not be enough time for the coasting coach module(s) 160 to provide full coasting coach support for both stops. The coasting coach module(s) 160 will still provide support for the first learned stop 320, beginning at the start point 324, and the coasting coach indicator can be presented. However, for the second learned stop 330, the coasting coach indicator may still be presented due to the reset distance 326 for the first learned stop 320, but coasting coach support is not actually being provided for the second learned stop 330. The coasting coach module(s) 160 may not be able to simultaneously provide coaching coach support for both stops. Consequently, a driver may be potentially given a false impression that coasting coach support is available for the second learned stop 330 when in fact it is not.

Whether two consecutive learned deceleration areas are located "in close proximity" to each other can be determined in one or more ways. In one or more arrangements, "in close proximity" can mean that a first learned deceleration area and a second learned deceleration area are located within a predetermined distance of each other. In one or more arrangements, "in close proximity" means that the start point for coasting coach support for a second learned deceleration area overlaps the reset distance of a first learned deceleration area. The term "the start point for coasting coach support for a second learned deceleration area overlaps the reset distance of a first learned deceleration area" and variants thereof means the location of the start point for coasting coach support for the second learned deceleration area is at least partially located within any portion of the reset distance for the first learned deceleration area.

If it is determined that the first learned stop 320 and the second learned stop 330 are located in close proximity to each other, the coasting coach module(s) 160 can be configured to automatically disable the coasting coach indicator for the second learned stop 330. As a result, the coasting coach indicator will not presented within the vehicle for the second learned stop 330. Thus, the driver is informed that coasting coach support is not provided for the second learned stop 330. The coasting coach indicator can be presented for the first learned stop 320, and coasting coach support can be provided for the first learned stop 320.

If it is determined that the first learned stop 320 and the second learned stop 330 are not located in close proximity to each other, the coasting coach module(s) 160 can be configured to present the coasting coach indicator for both the first learned stop 320 and the second learned stop 330. The coasting coach module(s) 160 can be configured to provide coasting coach support for both the first learned stop 320 and the second learned stop 330.

In either scenario, vehicle deceleration data for the first learned stop 320 and/or the second learned stop 330 can be acquired using one or more sensors of the sensor system 120. The vehicle deceleration data can be stored in the data store(s) 115 for any suitable future use.

Figure 4:
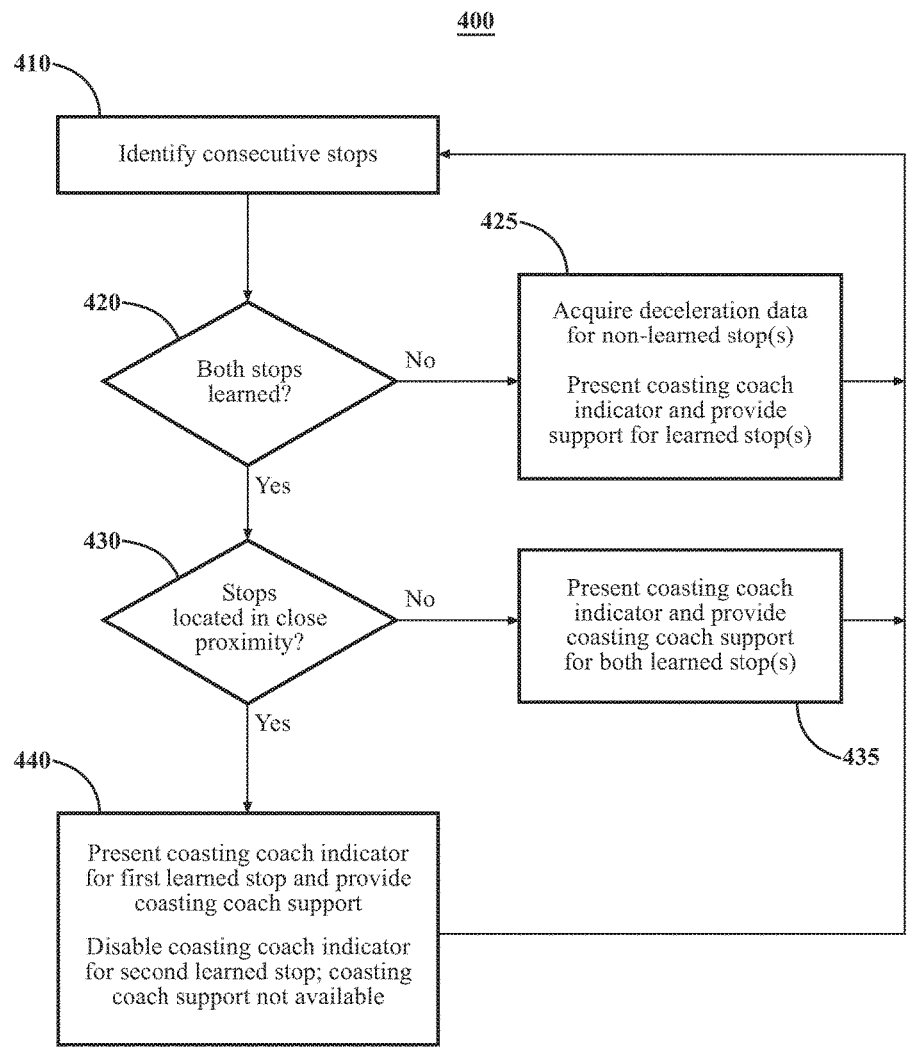
FIG. 4 is an example of a method of vehicle operation when two consecutive deceleration areas located in close proximity are encountered.

Now that the various potential systems, devices, elements and/or components of the vehicle 100 have been described, various methods of operating the vehicle will now be described. Referring now to FIG. 4, an example of a method 400 is shown. Various possible steps of such methods will now be described. The method 400 illustrated in FIG. 4 may be applicable to the arrangements described above in relation to FIGS. 1-3, but it is understood that the method 400 can be carried out with other suitable systems and arrangements. Moreover, the method 400 may include other steps that are not shown here, and in fact, the method 400 is not limited to including every step shown. The blocks that are illustrated here as part of the method 400 are not limited to the particular chronological order. Indeed, some of the blocks may be performed in a different order than what is shown and/or at least some of the blocks shown can occur simultaneously.

At block 410, consecutive stops along a travel route can be identified. The consecutive stops can include a first stop and a second stop. The second stop can be subsequent to the first stop in the travel direction of the vehicle. The consecutive stops can be identified at any suitable time. For instance, the consecutive stops can be identified when a travel route is determined or at any time thereafter. In one or more arrangements, the consecutive stops can be identified in real-time. In one or more arrangements, the consecutive stops can be identified as the vehicle approaches each stop. In one or more arrangements, when the vehicle enters a first deceleration area, the vehicle 100 can look ahead to identify the next deceleration area and determine the support starting point for the next upcoming deceleration area. In one or more arrangements, the consecutive stops can be identified at substantially the same time, or they can be identified at different times. The identifying of the consecutive stops can be performed by any suitable element or combination of elements of the vehicle 100. In one or more arrangements, the identifying of the consecutive stops can be performed, at least in part, by the navigation system 150, the coasting coach module(s) 160, and/or the processor(s) 110. The method can continue to decision block 420.

At decision block 420, it can be determined whether the consecutive stops are learned stops. Such a determination in any suitable manner, such as by querying the data store(s) 115 for vehicle deceleration data 118. The determining of whether the consecutive stops are learned stops can be performed at any suitable time. For instance, whether a stop is a learned stop can be determined as each stop is approached by the vehicle. Alternatively, whether a stop is a learned stop can be determined before one or both of the stops is approached. Still further, whether a stop is learned can be determined when a travel route is determined or at any time thereafter. The determining of whether the consecutive stops are learned stops can be performed by any suitable element or combination of elements of the vehicle 100. In one or more arrangements, the determining of whether the consecutive stops are learned stops can be performed, at least in part, by the navigation system 150, the coasting coach module(s) 160, and/or the processor(s) 110.

If at least one of the first stop and the second stop is a non-learned stop, then the method 400 can end, return to block 410, or continue to some other block. For instance, the method can continue to block 425. At block 425, deceleration data for the non-learned stop(s) can be acquired using one or more sensors of the sensor system 120. The acquired vehicle deceleration data can be stored in the one or more data store(s) 115. By acquiring the vehicle deceleration data, the non-learned stop(s) may eventually become learned stop(s) for the vehicle 100. The vehicle deceleration data can be analyzed by the coasting coach module(s) 160 and/or the processor(s) 110.

Further, if one of the stops is a learned stop, then a coasting coach indicator can be presented or caused to be presented within the vehicle 100 for the learned stop. As used herein, "cause" or "causing" means to make, force, compel, direct, command, instruct, and/or enable an event or action to occur or at least be in a state where such event or action may occur, either in a direct or indirect manner. For example, the coasting coach indicator can be an icon presented on a display. The coasting coach indicator can inform a driver that coasting coach support is provided for the first learned stop. In addition, coasting coach support can be provided for the learned stop. For example, coasting coach support can be provided in a visual manner on a display 136 within the vehicle 100. The display 136 can be the same display in which the coasting coach indicator is presented, or it can be a different display. After block 445, the method 400 can end, return to block 410, or continue to some other block.

If both the first stop and the second stop are learned stops, then the method 400 can continue to decision block 430. At decision block 430, it can be determined whether the first learned stop and the second learned stop are located in close proximity to each other. The determination of whether the first learned stop and the second learned stop are located in close proximity to each other can be performed in any suitable manner. For instance, it can be determined whether the start point for coasting coach support for the second learned stop overlaps the reset distance of the first learned stop. The reset distance can be obtained from any suitable source, such as the data store(s) 115 and/or the coasting coach module(s) 160. The start point for coasting coach support for the second learned stop can be a predetermined distance from the second learned stop. In such case, the predetermined distance can be included, for example, in the vehicle deceleration data 118 for the second learned stop. In one or more arrangements, the start point can be a dynamic value that is computed during each stop based on real-time data acquired by the sensor system 120 and/or the navigation system 150. The determining of start point for the coasting coach support for the second learned stop can be performed, at least in part, by the navigation system 150, the coasting coach module(s) 160, and/or the processor(s) 110.

The determination of whether the start point for coasting coach support for the second learned stop overlaps the reset distance of the first learned stop can be performed at any suitable time. For instance, the determination can be performed as the vehicle approaches the first learned stop, approaches the second learned stop, before the vehicle 100 commences travel, prior to approaching the first learned stop, and/or while stopped at the first learned stop, just to name a few possibilities.

If the first learned stop and the second learned stop are not located in close proximity to each other, then the method can continue to block 435. At block 435, a coasting coach indicator can be presented or caused to be presented within the vehicle 100 for both the first learned stop and the second learned stop. In addition, coasting coach support can be provided for the first learned stop and the second learned stop when the vehicle 100 reaches the start point for coasting coach support for each respective stop. After block 435, the method 400 can end, return to block 410, or continue to some other block.

If the first learned stop and the second learned stop are located in close proximity to each other, then the method 400 can continue to block 440. At block 440, the coasting coach indicator can be presented or caused to be presented within the vehicle 100 for the first learned stop. Thus, a driver can be informed that coasting coach support is provided for the first learned stop. Coasting coach support can be provided for the first stop (e.g., beginning at the start point for the first stop). However, for the second learned stop, the coating coach indicator can be disabled, despite the second learned stop being a stop that would otherwise be supported. As a result, the coasting coach indicator is not presented within the vehicle for the second learned stop. Thus, the driver is informed that coasting coach support is not provided for the second learned stop. However, in one or more arrangements, deceleration data for the second learned stop can be acquired using one or more sensors of the sensor system 120. The acquired vehicle deceleration data can be stored in the one or more data store(s) 115. The acquired vehicle deceleration data can be used for any suitable purposes in the future. After block 440, the method 400 can end, return to block 410, or continue to some other block.

It should be noted that, while the method 400 is described with respect to two consecutive learned stops, it will be appreciated that the above-description of the method 400 can apply equally to scenarios in which there are two consecutive learned deceleration areas. The method 400 can also apply to scenario in which there is a learned stop and a learned deceleration area, consecutive in any order.

It will be appreciated that arrangements described herein can provide numerous benefits, including one or more of the benefits mentioned herein. For example, arrangements described herein can disable unnecessary learning support icons for coasting coaching when coasting coach support cannot be provided at that time. By disabling the coasting coach indicator for learned deceleration areas/stops where coasting coach support cannot be provided, vehicle-driver interaction can be improved. Further, arrangements described herein can make clear which learned deceleration areas/learned stops have coasting coach support. Arrangements described herein can allow drivers to easily understand when coasting coach support is provided and when it is not provided.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method for a vehicle, the vehicle being configured to provide coasting coach support when approaching a learned deceleration area, the vehicle being configured to present a coasting coach indicator within the vehicle for the learned deceleration area, the method comprising:
   identifying, while the vehicle is in use, consecutive learned deceleration areas including a first learned deceleration area and a second learned deceleration area, the second learned deceleration area being subsequent to the first learned deceleration area along a travel path of the vehicle, the first learned deceleration area and the second learned deceleration area being identified using a navigation system within the vehicle, the navigation system including a global positioning system, a local positioning system, a geolocation system, camera-based localization, laser-based localization, or combinations thereof;
   determining whether the first learned deceleration area and the second learned deceleration area are located in close proximity to each other;
   responsive to determining that the first learned deceleration area and the second learned deceleration area are located in close proximity to each other:
   presenting the coasting coach indicator within the vehicle for the first learned deceleration area, whereby a driver is informed that coasting coach support is provided for the first learned deceleration area, and wherein the vehicle provides coasting coach support for the first learned deceleration area; and
   disabling the coasting coach indicator for the second learned deceleration area, whereby the coasting coach indicator is not presented within the vehicle for the second learned deceleration area such that the driver is informed that coasting coach support is not provided for the second learned deceleration area, and wherein the vehicle does not provide coasting coach support for the second learned deceleration area.

2. The method of claim 1, wherein at least one of the first learned deceleration area and the second learned deceleration area is a learned stop.

3. The method of claim 1, further including:
   responsive to determining that the first learned deceleration area and the second learned deceleration area are not located in close proximity to each other, presenting the coasting coach indicator within the vehicle for both the first learned deceleration area and the second learned deceleration area, whereby the driver is informed that coasting coach support is provided for both the first learned deceleration area and the second learned deceleration area.

4. The method of claim 1, wherein the coasting coach indicator is a visual indicator.

5. The method of claim 1, further including:
   acquiring, using one or more sensors, vehicle deceleration data for the second learned deceleration area.

6. The method of claim 1, wherein determining whether the first learned deceleration area and the second learned deceleration area are located in close proximity to each other includes:
   determining a reset distance for the first learned deceleration area;
   determining a start point for coasting coach support for the second learned deceleration area;
   determining whether the start point for coasting coach support for the second learned deceleration area overlaps the reset distance of the first learned deceleration area; and
   responsive to determining that the start point for coasting coach support for the second learned deceleration area overlaps the reset distance of the first learned deceleration area, determining that the first learned deceleration area and the second learned deceleration area are located in close proximity to each other.

7. The method of claim 6, further including:
   responsive to determining that the start point for coasting coach support for the second learned deceleration area does not overlap the reset distance of the first learned deceleration area, determining that the first learned deceleration area and the second learned deceleration area are not located in close proximity to each other.

8. The method of claim 6, wherein the start point for coasting coach support for the second learned deceleration area is located a predetermined distance before the second learned deceleration area along the travel path of the vehicle.

9. The method of claim 6, wherein the reset distance is a predetermined distance after the first learned deceleration area along the travel path of the vehicle.

10. A system for a vehicle, the vehicle being configured to provide coasting coach support when approaching a learned deceleration area, the vehicle being configured to present a coasting coach indicator within the vehicle for the learned deceleration area, the system comprising:
    a navigation system within the vehicle, the navigation system including a global positioning system, a local positioning system, a geolocation system, camera-based localization, laser-based localization, or combinations thereof; and
    one or more processors, the one or more processors being programmed to initiate executable operations comprising:
    identifying, using the navigation system while the vehicle is in use, consecutive learned deceleration areas including a first learned deceleration area and a second learned deceleration area, the second learned deceleration area being subsequent to the first learned deceleration area along a travel path of the vehicle;
    determining whether the first learned deceleration area and the second learned deceleration area are located in close proximity to each other;
    responsive to determining that the first learned deceleration area and the second learned deceleration area are located in close proximity to each other:
    presenting the coasting coach indicator within the vehicle for the first learned deceleration area, whereby a driver is informed that coasting coach support is provided for the first learned deceleration area, and wherein the vehicle provides coasting coach support for the first learned deceleration area; and
    disabling the coasting coach indicator for the second learned deceleration area, whereby the coasting coach indicator is not presented within the vehicle for the second learned deceleration area such that the driver is informed that coasting coach support is not provided for the second learned deceleration area, and wherein the vehicle does not provide coasting coach support for the second learned deceleration area.

11. The system of claim 10, wherein at least one of the first learned deceleration area and the second learned deceleration area is a learned stop.

12. The system of claim 10, wherein the executable operations further include:
responsive to determining that the first learned deceleration area and the second learned deceleration area are not located in close proximity to each other, presenting the coasting coach indicator within the vehicle for both the first learned deceleration area and the second learned deceleration area, whereby the driver is informed that coasting coach support is provided for both the first learned deceleration area and the second learned deceleration area.

13. The system of claim 10, wherein the coasting coach indicator is a visual indicator.

14. The system of claim 10, further including one or more sensors operatively connected to the one or more processors, and wherein the executable operations further include:
acquiring, using the one or more sensors, vehicle deceleration data for the second learned deceleration area.

15. The system of claim 10, wherein determining whether the first learned deceleration area and the second learned deceleration area are located in close proximity to each other includes:
determining a reset distance for the first learned deceleration area;
determining a start point for coasting coach support for the second learned deceleration area;
determining whether the start point for coasting coach support for the second learned deceleration area overlaps the reset distance of the first learned deceleration area; and
responsive to determining that the start point for coasting coach support for the second learned deceleration area overlaps the reset distance of the first learned deceleration area, determining that the first learned deceleration area and the second learned deceleration area are located in close proximity to each other.

16. The system of claim 15, further including:
responsive to determining that the start point for coasting coach support for the second learned deceleration area does not overlap the reset distance of the first learned deceleration area, determining that the first learned deceleration area and the second learned deceleration area are not located in close proximity to each other.

17. The system of claim 15, wherein the start point for coasting coach support for the second learned deceleration area is located a predetermined distance before the second learned deceleration area along the travel path of the vehicle.

18. The system of claim 15, wherein the reset distance is a predetermined distance after the first learned deceleration area along the travel path of the vehicle.

19. A computer program product for a vehicle, the vehicle being configured to provide coasting coach support when approaching a learned deceleration area, the vehicle being configured to present a coasting coach indicator within the vehicle for the learned deceleration area, the computer program product comprising a non-transitory computer readable storage medium having program code embodied therein, the program code executable by a processor to perform a method comprising:
identifying, using a navigation system while the vehicle is in use, consecutive learned deceleration areas including a first learned deceleration area and a second learned deceleration area, the second learned deceleration area being subsequent to the first learned deceleration area along a travel path of the vehicle, the navigation system being within the vehicle, the navigation system including a global positioning system, a local positioning system, a geolocation system, camera-based localization, laser-based localization, or combinations thereof;
determining whether the first learned deceleration area and the second learned deceleration area are located in close proximity to each other;
responsive to determining that the first learned deceleration area and the second learned deceleration area are located in close proximity to each other:
presenting the coasting coach indicator within the vehicle for the first learned deceleration area, whereby a driver is informed that coasting coach support is provided for the first learned deceleration area, and wherein the vehicle provides coasting coach support for the first learned deceleration area; and
disabling the coasting coach indicator for the second learned deceleration area, whereby the coasting coach indicator is not presented within the vehicle for the second learned deceleration area such that the driver is informed that coasting coach support is not provided for the second learned deceleration area, and wherein the vehicle does not provide coasting coach support for the first learned deceleration area.

20. The computer program product of claim 19, wherein determining whether the first learned deceleration area and the second learned deceleration area are located in close proximity to each other includes:
determining a reset distance for the first learned deceleration area;
determining a start point for coasting coach support for the second learned deceleration area;
determining whether the start point for coasting coach support for the second learned deceleration area overlaps the reset distance of the first learned deceleration area; and
responsive to determining that the start point for coasting coach support for the second learned deceleration area overlaps the reset distance of the first learned deceleration area, determining that the first learned deceleration area and the second learned deceleration area are located in close proximity to each other.

* * * * *